(12) United States Patent
Dowers, II et al.

(10) Patent No.: US 10,684,921 B1
(45) Date of Patent: Jun. 16, 2020

(54) SYSTEMS AND METHODS FOR NAVIGATING BACKUP CONFIGURATIONS

(75) Inventors: Gregory R. Dowers, II, Lake Mary, FL (US); Thomas Weaver, Orlando, FL (US)

(73) Assignee: Veritas Technologies LLC, Santa Clara, CA (US)

( * ) Notice: Subject to any disclaimer, the term of this patent is extended or adjusted under 35 U.S.C. 154(b) by 1561 days.

(21) Appl. No.: 13/314,538

(22) Filed: Dec. 8, 2011

(51) Int. Cl.
*G06F 11/14* (2006.01)

(52) U.S. Cl.
CPC ...... *G06F 11/1458* (2013.01); *G06F 11/1461* (2013.01)

(58) Field of Classification Search
None
See application file for complete search history.

(56) References Cited

U.S. PATENT DOCUMENTS

| | | | |
|---|---|---|---|
| 6,745,210 B1 * | 6/2004 | Scanlan | G06F 11/0727 |
| 7,054,892 B1 * | 5/2006 | Phillips | G06F 11/1458 |
| 7,631,068 B1 * | 12/2009 | Martins | G06F 11/328 370/363 |
| 7,634,511 B1 * | 12/2009 | Freiheit et al. | |
| 7,676,689 B1 * | 3/2010 | Shioyama et al. | 714/6.12 |
| 7,937,546 B2 | 5/2011 | Hiraiwa et al. | |
| 7,949,635 B1 * | 5/2011 | Korshunov et al. | 707/636 |
| 2004/0240097 A1 | 12/2004 | Evans | |
| 2005/0015662 A1 | 1/2005 | Scanlan | |
| 2009/0172044 A1 * | 7/2009 | Page et al. | 707/204 |
| 2009/0177990 A1 | 7/2009 | Chen et al. | |
| 2009/0307236 A1 | 12/2009 | Kramer et al. | |
| 2010/0082505 A1 | 4/2010 | Hollingsworth et al. | |
| 2010/0107104 A1 | 4/2010 | Bruce et al. | |
| 2011/0041004 A1 | 2/2011 | Miwa et al. | |
| 2012/0011408 A1 | 1/2012 | Swamy et al. | |
| 2012/0303548 A1 * | 11/2012 | Johnson | G06Q 40/04 705/36 R |

(Continued)

FOREIGN PATENT DOCUMENTS

WO WO 2010010393 A1 * 1/2010 .......... G06F 11/1451

OTHER PUBLICATIONS

"ShadowProtect User Guide." STC Admin. (Nov. 30, 2011). Retrieved Nov. 7, 2016, from http://support.servosity.com/hc/en-us/article_attachments/204847697/ShadowProtect_User_Guide-v7-20111130_0623.pdf.*

(Continued)

*Primary Examiner* — Taelor Kim
*Assistant Examiner* — Eddy Cheung
(74) *Attorney, Agent, or Firm* — FisherBroyles, LLP

(57) ABSTRACT

A computer-implemented method for navigating backup configurations may include (1) identifying a set of computing resources within a backup environment managed by a backup system, (2) identifying a request to navigate a configuration of the backup system, and, in response to the request, (3) displaying the set of computing resources within a graphical user interface as selectable elements, (4) identifying a selection within the graphical user interface of at least one computing resource within the set of computing resources, (5) receiving an input within the graphical user interface to provide backup information relating to the selection, and, in response to the input, (6) displaying the backup information. Various other methods, systems, and computer-readable media are also disclosed.

20 Claims, 9 Drawing Sheets

(56) References Cited

U.S. PATENT DOCUMENTS

2013/0086000 A1* 4/2013 Mostachetti ........ G06F 11/1448
707/654

OTHER PUBLICATIONS

Barker, Shawn; Microsoft Active Directory Backup and Recovery in Windows Server 2008; 2007; Quest Software, Inc.
Kirk Hartmann Freiheit et al.; Systems and Methods for Providing Backup Interfaces; U.S. Appl. No. 13/314,517, filed Dec. 8, 2011.
Theodore J. Kaiser, IV et al.; Systems and Methods for Providing Backup Storage Interfaces; U.S. Appl. No. 13/314,557, filed Dec. 8, 2011.
Gregory R. Dowers, II, et al.; Systems and Methods for Displaying Backup-Status Information for Computing Resources; U.S. Appl. No. 13/356,114, filed Jan. 23, 2012.
Thomas Weaver, et al; Systems and Methods for Simultaneously Configuring Multiple Independent Backups; U.S. Appl. No. 13/358,245, filed Jan. 25, 2012.
Kirk Hartmann Freiheit, et al.; Systems and Methods for Providing Backup Interfaces; U.S. Appl. No. 14/065,389, filed Oct. 28, 2013.

* cited by examiner

SYSTEMS AND METHODS FOR NAVIGATING BACKUP CONFIGURATIONS

BACKGROUND

In the digital age, organizations increasingly rely on digitally-stored data. To protect against data loss, an organization may use one or more backup systems to back up important data.

Due to increasingly complex information technology infrastructures, an organization may create backups from a variety of sources, using a variety of methods, and according to a variety of different schedules. Accordingly, an administrator may face a proliferation of backup jobs to manage. In an attempt to facilitate the administration of backup jobs, traditional backup administration systems may allow an administrator to view a list of backup jobs configured to protect data within an enterprise.

Unfortunately, traditional backup administration systems may be cumbersome to navigate, especially when an administrator needs information about the backup status of one or more resources within the enterprise. For example, in order to view backup jobs performed for a specific group of servers (e.g., pertaining to a department within the enterprise), an administrator may need to sort through a large list of backup jobs, either manually or using a list filtering system that may be over-complex or underpowered. For these reasons, managing backup environments using traditional backup administration systems may be difficult, time-consuming, and may introduce opportunities for oversight or other human error. Accordingly, the instant disclosure identifies and addresses a need for additional and improved systems and methods for navigating backup configurations.

SUMMARY

As will be described in greater detail below, the instant disclosure generally relates to systems and methods for navigating backup configurations by providing a resource-centric view of backup environments (e.g., instead of a job-centric view). In one example, a computer-implemented method for navigating backup configurations may include (1) identifying a set of computing resources within a backup environment managed by a backup system, (2) identifying a request to navigate a configuration of the backup system, and, in response to the request, (3) displaying the set of computing resources within a graphical user interface as selectable elements, (4) identifying a selection within the graphical user interface of at least one computing resource within the set of computing resources, (5) receiving an input within the graphical user interface to provide backup information relating to the selection, and, in response to the input, (6) displaying the backup information.

In some examples, the selection may include a plurality of computing resources within the set of computing resources. In these examples, the backup information may include information relating to the plurality of computing resources. In some embodiments, identifying the selection may include identifying a selection of a predefined group represented within the graphical user interface. Additionally or alternatively, identifying the selection may include identifying an individual selection within the graphical user interface of each computing resource within a subset of the set of computing resources.

In some embodiments, the backup information may include at least one backup job defined for a selected computing resource within the set of computing resources, a backup history of the selected computing resource, and/or at least one alert from the backup system relating to the selected computing resource.

In some examples, displaying the backup information may include (1) displaying a plurality of backup information categories, (2) identifying a selected category within the plurality of backup information categories, and (3) displaying information pertaining to the selected category. In these examples, displaying the plurality of backup information categories may include (1) identifying a plurality of computing resources within the selection, (2) determining that each category within the plurality of backup information categories pertains to the plurality of computing resources in combination, (3) identifying at least one inapplicable category that pertains to at least one computing resource within the plurality of computing resources but which does not pertain the plurality of computing resources in combination, and (4) excluding the inapplicable category from the plurality of backup information categories.

In at least one example, displaying the backup information may include, in response to the input, displaying a transition within the graphical user interface between a view of the set of computing resources and a view of the backup information, the transition including at least one intermediate view, the intermediate view including at least a portion of the view of the set of computing resources and at least a portion of the view of the backup information.

In one embodiment, a system for implementing the above-described method may include an identification module programmed to (1) identify a set of computing resources within a backup environment managed by a backup system and (2) identify a request to navigate a configuration of the backup system. The system may also include an interface module programmed to, in response to the request, (1) display the set of computing resources within a graphical user interface as selectable elements, (2) identify a selection within the graphical user interface of at least one computing resource within the set of computing resources, (3) receive an input within the graphical user interface to provide backup information relating to the selection, and, in response to the input, (4) display the backup information. The system may also include at least one processor configured to execute the identification module and the interface module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a set of computing resources within a backup environment managed by a backup system, (2) identify a request to navigate a configuration of the backup system, and, in response to the request, (3) display the set of computing resources within a graphical user interface as selectable elements, (4) identify a selection within the graphical user interface of at least one computing resource within the set of computing resources, (5) receive an input within the graphical user interface to provide backup information relating to the selection, and, in response to the input, (6) display the backup information.

As will be explained in greater detail below, by providing a resource-centric view of backup environments (e.g., instead of a job-centric view), the systems and methods described herein may enable administrators to intuitively navigate through backup environments. In some examples, these systems and methods may also enable administrators to efficiently and intuitively transition between resource-centric views of backup environments and job-centric views based on selected resources. By improving the navigability of backup environments, these systems and methods may reduce time and effort spent managing backup environments and potentially reduce human error.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
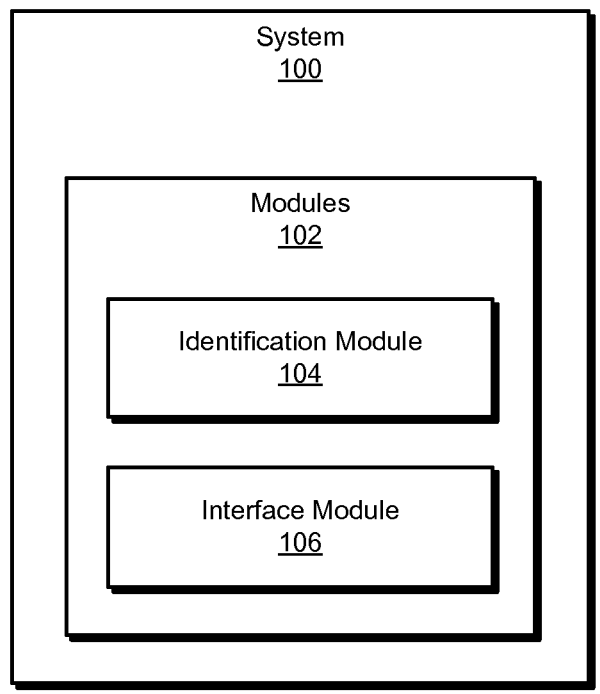
FIG. 1 is a block diagram of an exemplary system for navigating backup configurations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
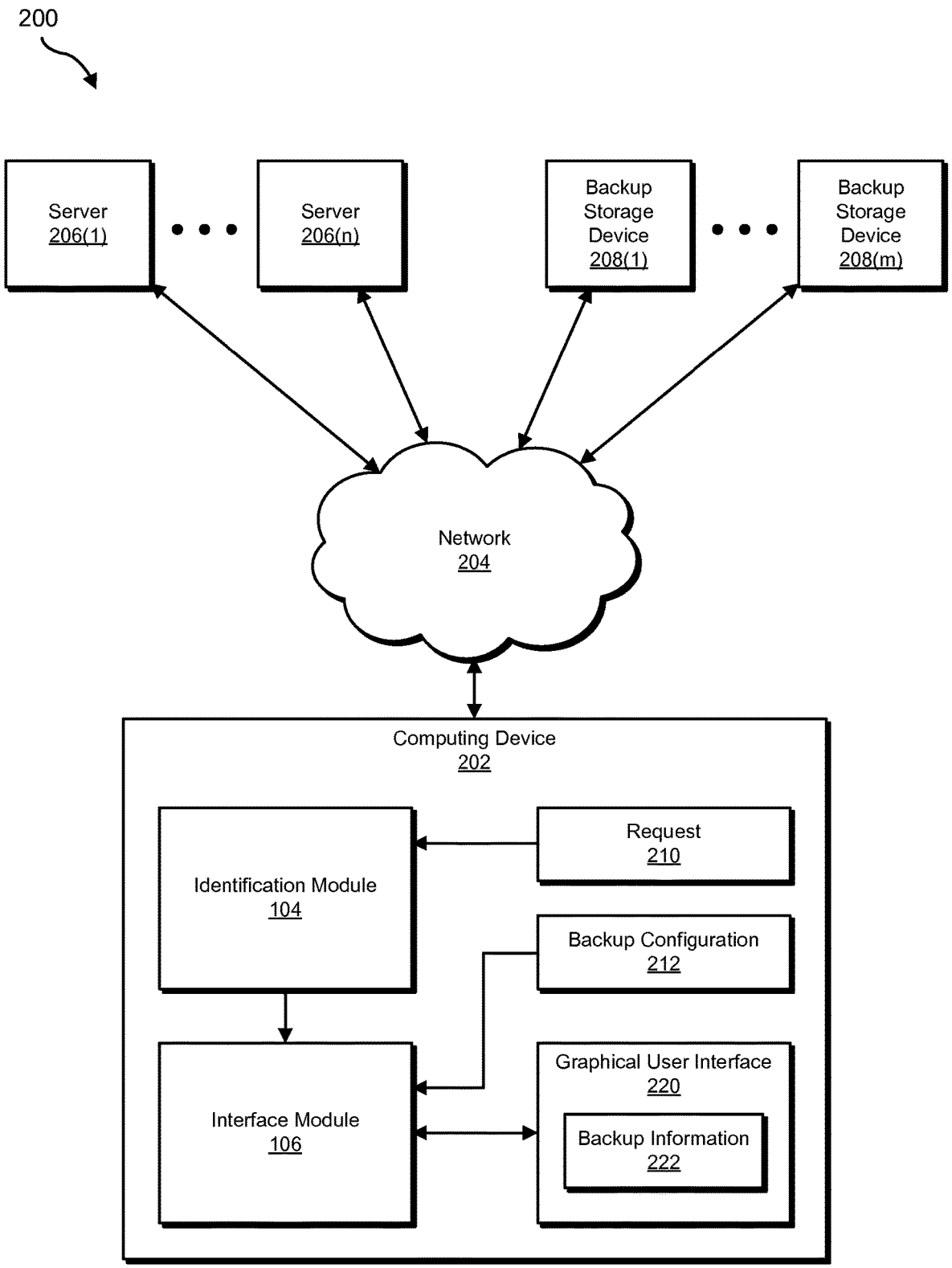
FIG. 2 is a block diagram of an exemplary system for navigating backup configurations.

The following will provide, with reference to FIGS. 1-2, detailed descriptions of exemplary systems for navigating backup configurations. Detailed descriptions of corresponding computer-implemented methods will also be provided in connection with FIG. 3. Detailed descriptions of exemplary graphical user interfaces will be provided in connection with FIGS. 4-7. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for navigating backup configurations. As illustrated in this figure, exemplary system 100 may include one or more modules 102 for performing one or more tasks. For example, and as will be explained in greater detail below, exemplary system 100 may include an identification module 104 programmed to (1) identify a set of computing resources within a backup environment managed by a backup system and (2) identify a request to navigate a configuration of the backup system.

In addition, and as will be described in greater detail below, exemplary system 100 may include an interface module 106 programmed to, in response to the request, (1) display the set of computing resources within a graphical user interface as selectable elements, (2) identify a selection within the graphical user interface of at least one computing resource within the set of computing resources, (3) receive an input within the graphical user interface to provide backup information relating to the selection, and, in response to the input, (4) display the backup information. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, servers 206(1)-(n), and/or backup storage devices 208(1)-(m)), computing system 810 in FIG. 8, and/or portions of exemplary network architecture 900 in FIG. 9. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with servers 206(1)-(n) and backup storage devices 208(1)-(m) via a network 204. For example, computing device 202 may represent a backup central administration server used to view and/or configure backup jobs for backing up data from one or more of servers 206(1)-(n) to one or more of storage devices 208(1)-(m).

In one embodiment, one or more of modules 102 from FIG. 1 may, when executed by at least one processor of computing device 202, facilitate computing device 202 in navigating backup configurations. For example, and as will be described in greater detail below, one or more of modules 102 may cause computing device 202 to (1) identify a set of computing resources (e.g., servers 206(1)-(n)) within a backup environment (e.g., system 200) managed by a backup system (e.g., computing device 202), (2) identify a request (e.g., a request 210) to navigate a configuration of the backup system (e.g., a backup configuration 212), and, in response to the request, (3) display the set of computing resources within a graphical user interface (e.g., a graphical user interface 220) as selectable elements, (4) identify a selection within the graphical user interface of at least one computing resource within the set of computing resources (e.g., identify a selection within graphical user interface 220 of at least of servers 206(1)-(n)), (5) receive an input within the graphical user interface to provide backup information relating to the selection (e.g., backup information 222), and, in response to the input, (6) display the backup information (e.g., display backup information 222 within graphical user interface 220).

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 810 in FIG. 8, or any other suitable computing device.

Servers 206(1)-(n) generally represent any type or form of computing devices that are capable of storing, managing, and/or processing data. Examples of servers 206(1)-(n) include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 900 in FIG. 9, or the like. Network 204 may facilitate communication or data transfer using wireless or wired connections. In one embodiment, network 204 may facilitate communication between computing device 202 and servers 206(1)-(n) and/or backup storage devices 208(1)-(m).

Backup storage devices 208(1)-(m) may each represent portions of individual databases or storage devices or of pluralities of databases or storage devices. For example, one or more of backup storage devices 208(1)-(m) may represent a portion of servers 206(1)-(n) in FIG. 2, computing system 810 in FIG. 8, and/or portions of exemplary network architecture 900 in FIG. 9. Alternatively, backup storage devices 208(1)-(m) in FIG. 1 may represent one or more physically separate devices capable of being accessed by a computing device, such as servers 206(1)-(n) in FIG. 2, computing system 810 in FIG. 8, and/or portions of exemplary network architecture 900 in FIG. 9.

Figure 3:
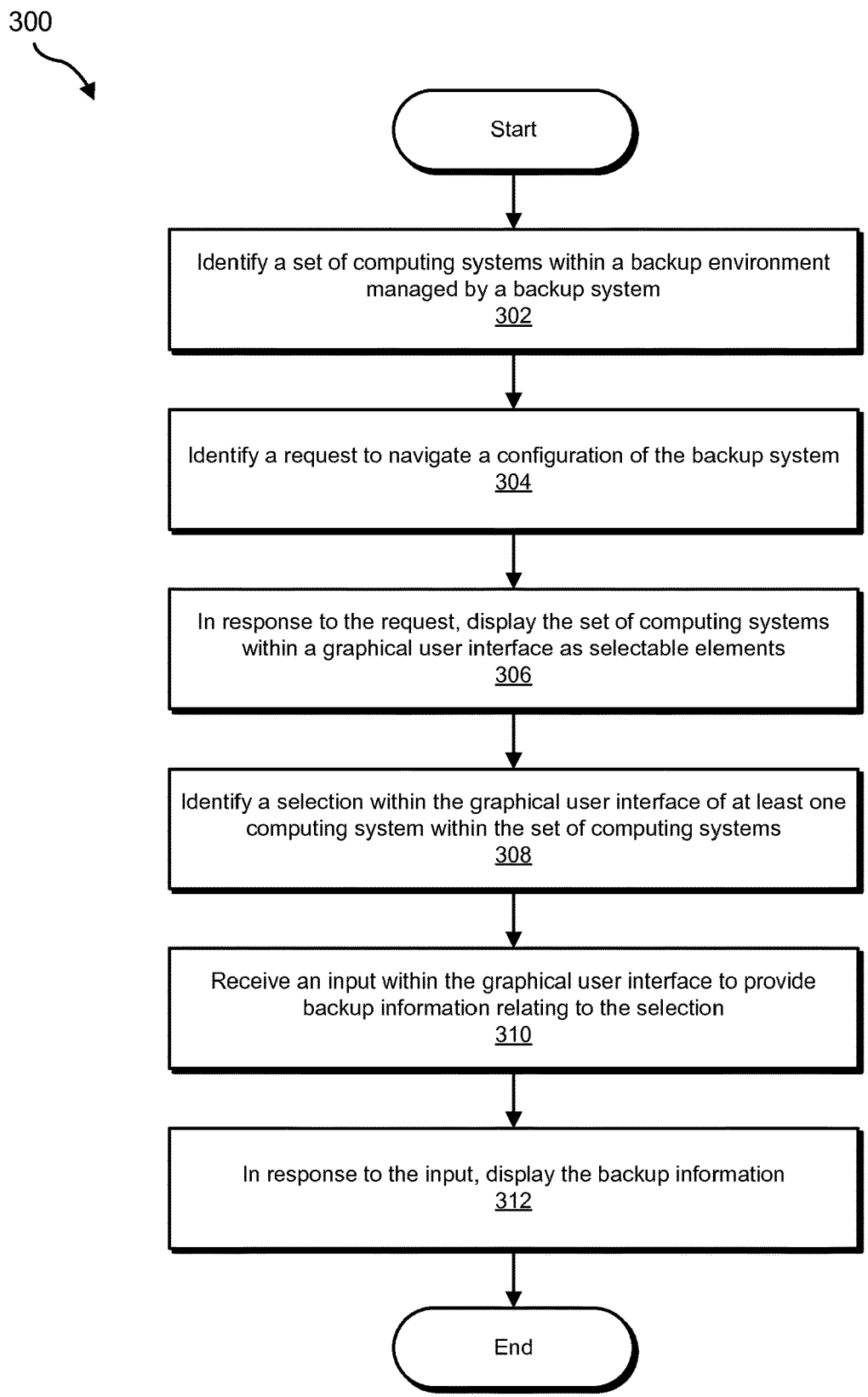
FIG. 3 is a flow diagram of an exemplary method for navigating backup configurations.

FIG. 3 is a flow diagram of an exemplary computer-implemented method 300 for navigating backup configurations. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

As illustrated in FIG. 3, at step 302 one or more of the systems described herein may identify a set of computing resources within a backup environment managed by a backup system. For example, at step 302 identification module 104 may, as part of computing device 202 in FIG. 2, identify servers 206(1)-(n).

As used herein, the phrase "computing resource" may refer to any computing resource that includes and/or uses data. For example, the term "computing resource" may refer to a server, a database, an application, and/or a volume. In some examples, the phrase "computing resource" may refer to a resource that may be backed up. As used herein, the phrase "backup environment" may refer to any collection of computing resources (e.g., within an enterprise, an information technology infrastructure, etc.) subject to backup management via a unified backup system. As used herein, the phrase "backup system" may refer to any system for backing up data. In some examples, the backup system may also replicate, archive, migrate, and/or virtualize data.

Identification module 104 may identify the set of computing resources in any suitable manner. For example, identification module 104 may access configuration data of the backup system to identify computing resources that have been imported for configuration in the backup system and/or that are subject to backup jobs. Additionally or alternatively, identification module 104 may access network topology information identifying one or more computing resources on the network. As used herein, the phrase "backup job" may refer to any configuration, script, and/or specifications for performing one or more backup operations. As used herein, the phrase "backup operation" may include any operation for backing up, protecting, transferring, and/or replicating data. Examples of backup operations include, without limitation, backing up data (e.g., to a disk, a tape, a deduplication data store, etc.), duplicating data (e.g., to a disk, a tape, etc.), archiving data, migrating data, creating a virtual copy of a system, etc.

Returning to FIG. 3, at step 304 one or more of the systems described herein may identify a request to navigate a configuration of the backup system. For example, at step 304 identification module 104 may, as part of computing device 202 in FIG. 2, identify request 210 to navigate backup configuration 212.

Identification module 104 may identify the request in any suitable context. For example, identification module 104 may identify the request when a backup administration program is loaded. Additionally or alternatively, identification module 104 may identify the request when an option within the backup administration program is selected and/or a module within the backup administration program is loaded.

At step 306, one or more of the systems described herein may, in response to the request, display the set of computing resources as selectable elements. For example, at step 306 interface module 106 may, as part of computing device 202 in FIG. 2, in response to request 210, display a representation of servers 206(1)-(n) as selectable elements within graphical user interface 220.

As used herein, the phrase "graphical user interface" may refer to any interface that may allow a user to interact with a computing system. In some examples, the graphical user interface may include an interface for a backup central administration server.

Interface module 106 may display the set of computing resources in any of a variety of ways. For example, interface module 106 may display the set of computing resources as a list, as a group of icons, within a network topology, as resource groups, and/or in any other suitable manner. Interface module 106 may display the set of computing resources as selectable elements using any of a variety of techniques. For example, interface module 106 may enable a user to click on one or more computing resources within the computing resources to highlight the computing resources.

Figure 4:
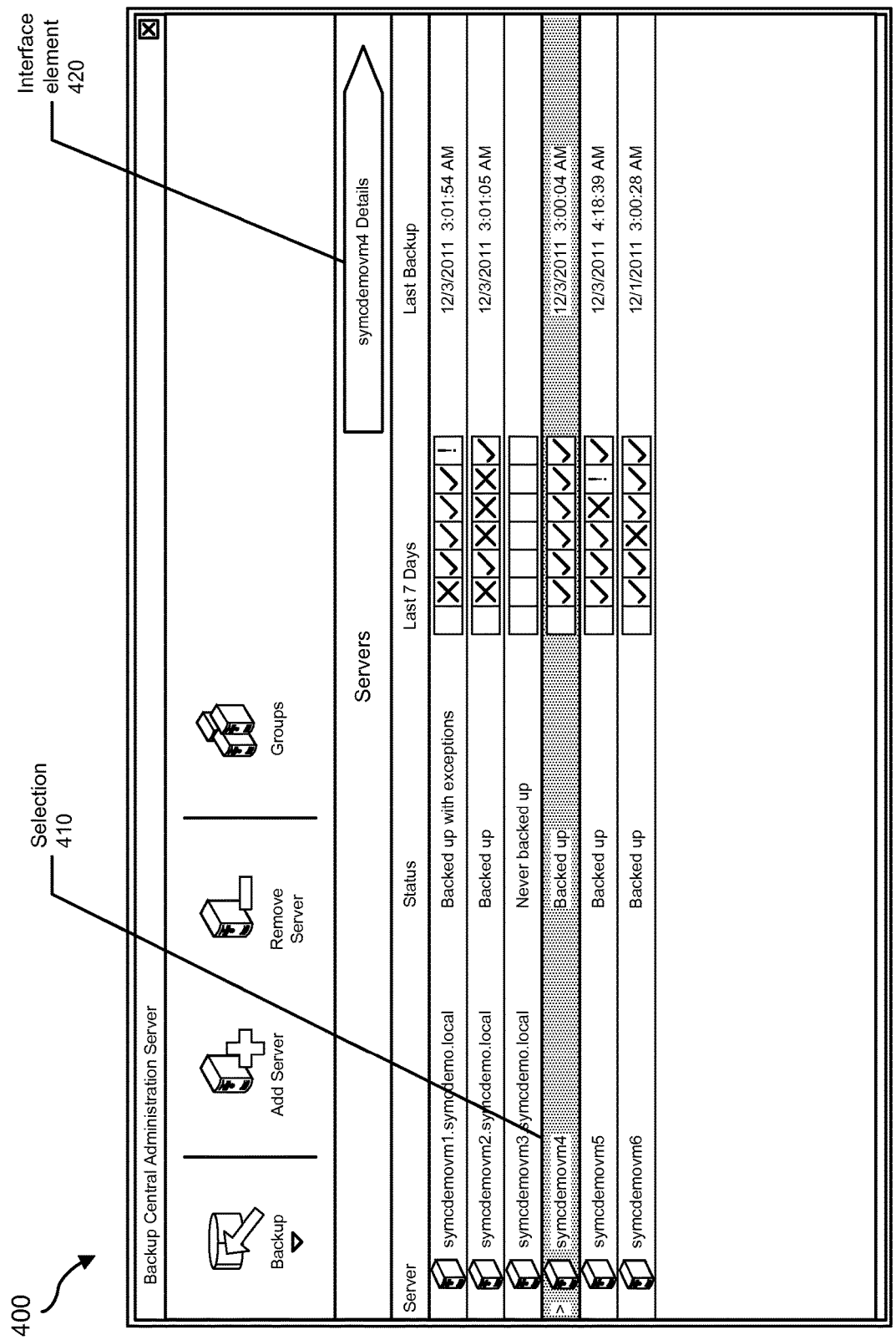
FIG. 4 is a diagram of an exemplary graphical user interface for navigating backup configurations.

FIG. 4 is an illustration of an exemplary graphical user interface 400. Using FIG. 4 as an example, interface module 106 may display six computing resources (e.g., servers) within graphical user interface 400. Interface module 106 may also display backup information relating to the displayed computing resources. For example, interface module 106 may display a current backup status of each computing resource, one or more past backup statuses of each computing resource, and/or a last backup time of each computing resource. In some examples, interface module 106 may also display a next scheduled backup time of each computing resource and/or one or more alerts for at least one computing resource. As shown in FIG. 4, a selection 410 may show that a computing resource (server "symcdemovm4") is selected within graphical user interface 400.

Returning to FIG. 3, at step 308 one or more of the systems described herein may, in response to the request, identify a selection within the graphical user interface of at least one computing resource within the set of computing resources. For example, at step 308 interface module 106 may, as part of computing device 202 in FIG. 2, in response to request 210, identify a selection within graphical user interface 220 of at least of servers 206(1)-(n). Using FIG. 4 as an example, at step 308 interface module 106 may identify selection 410 of a computing resource within graphical user interface 400.

In some examples, interface module 106 may identify a selection of a single computing resource. Alternatively, interface module 106 may identify a selection of a plurality of computing resources within the set of computing resources. For example, interface module 106 may identify a selection of a predefined group represented within the graphical user interface. The predefined group may be defined by any of a variety of criteria. For example, the predefined group may include all computing resources within a specified department within an enterprise. Additionally or alternatively, the predefined group may include all computing resources dedicated to a specified task.

In some examples, interface module 106 may identify a selection of a plurality of computing resources within the set of computing resources by identifying an individual selection within the graphical user interface of each computing system within a subset of the set of computing systems. For example, interface module 106 may display the set of computing resources as a list of selectable elements within the graphical user interface. In this example, a user may select multiple computing resources within the list individually (e.g., by clicking on one computing resource to select the computing resource and then clicking on subsequent computing resources while holding a control key on the keyboard to add the subsequent computing resources to the selection).

Figure 5:
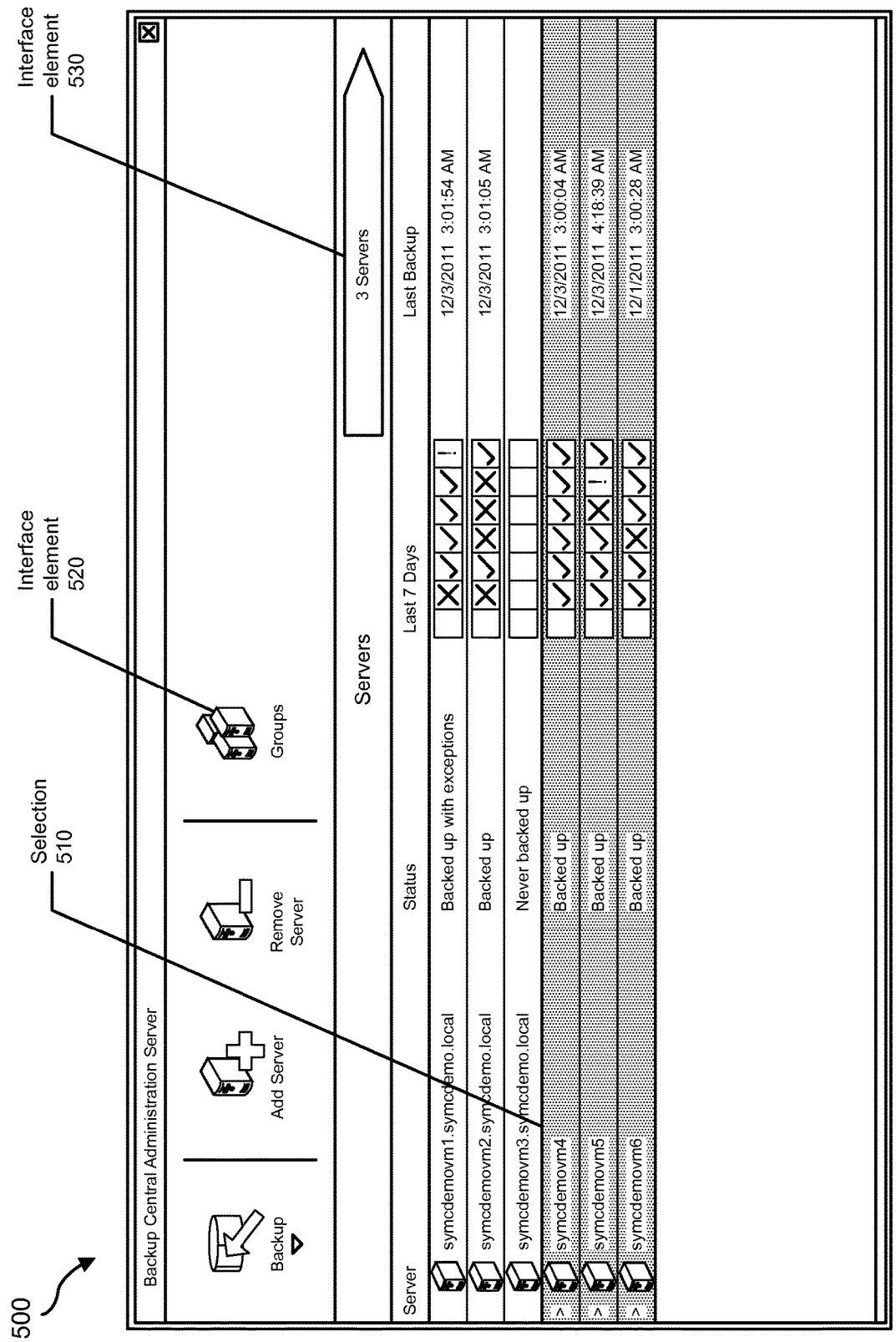
FIG. 5 is a diagram of an exemplary graphical user interface for navigating backup configurations.

FIG. 5 is an illustration of an exemplary graphical user interface 500. As shown in FIG. 5, a user may make a selection 510 of multiple computing resources (e.g., severs "symcdemovm4," "symcdemovm5," and "symcdemovm6"). Additionally or alternatively, the user may select a plurality of computing resources by selecting a predefined group of computing resources. For example, a user may interact with an interface element 520 (e.g., a "Groups" button) to provide a list of one or more selectable groups of computing resources.

Returning to FIG. 3, at step 310 one or more of the systems described herein may, in response to the request, receive an input within the graphical user interface to provide backup information relating to the selection. For example, at step 310 interface module 106 may, as part of computing device 202 in FIG. 2, in response to request 210, receive an input within graphical user interface 220 to provide backup information 222 relating to the selection. Using FIG. 4 as an example, at step 308 interface module 106 may identify selection 410 of a computing resource within graphical user interface 400.

As used herein, the phrase "backup information" may refer to any information about a computing resource relevant to managing the computing resource in the context of a backup environment. As will be explained in greater detail below, examples of backup information may include, without limitation, information relating to a computing resource, information relating to a backup job, and/or information relating to a past backup attempts. As mentioned earlier, in some examples the selection may include a plurality of computing resources. In these examples, the backup information may include information relating to the plurality of computing resources. For example, the backup information may include an aggregation of information relating to each computing resource within the plurality of computing resources. Additionally or alternatively, the backup information may include (and, e.g., may be limited to) information that relates to each and every computing resource within the plurality of computing resources.

Interface module 106 may receive the input to provide backup information relating to the selection in any suitable manner. In some examples, interface module 106 may receive the input as a part of receiving the input for the selection. Additionally or alternatively, interface module 106 may receive a separate input event to request backup information relating to the selection (e.g., clicking a button to provide backup details for the selection). In some examples, the input within the graphical user interface to provide backup information relating to the selection may provide a backup-job-centric view of the backup environment that is limited to the selection (e.g., showing one or more backup jobs that relate to each computing resource within the selection).

Using FIG. 4 as an example, a user may interact with (e.g., by clicking on) an interface element 420 within graphical user interface 400 to view backup details of selection 410. Using FIG. 5 as an example, a user may interact with (e.g., by clicking on) interface element 530 within graphical user interface 500 to view backup details of selection 510.

Returning to FIG. 3, at step 312 one or more of the systems described herein may, in response to the input, display the backup information. For example, at step 312 interface module 106 may, as part of computing device 202 in FIG. 2, display backup information 222 within graphical user interface 220.

As mentioned earlier, the backup information may include information relating to any of a variety of aspects of a backup environment and the selection. For example, the backup information may include one or more backup jobs configured for each computing resource within the selection.

Figure 6:
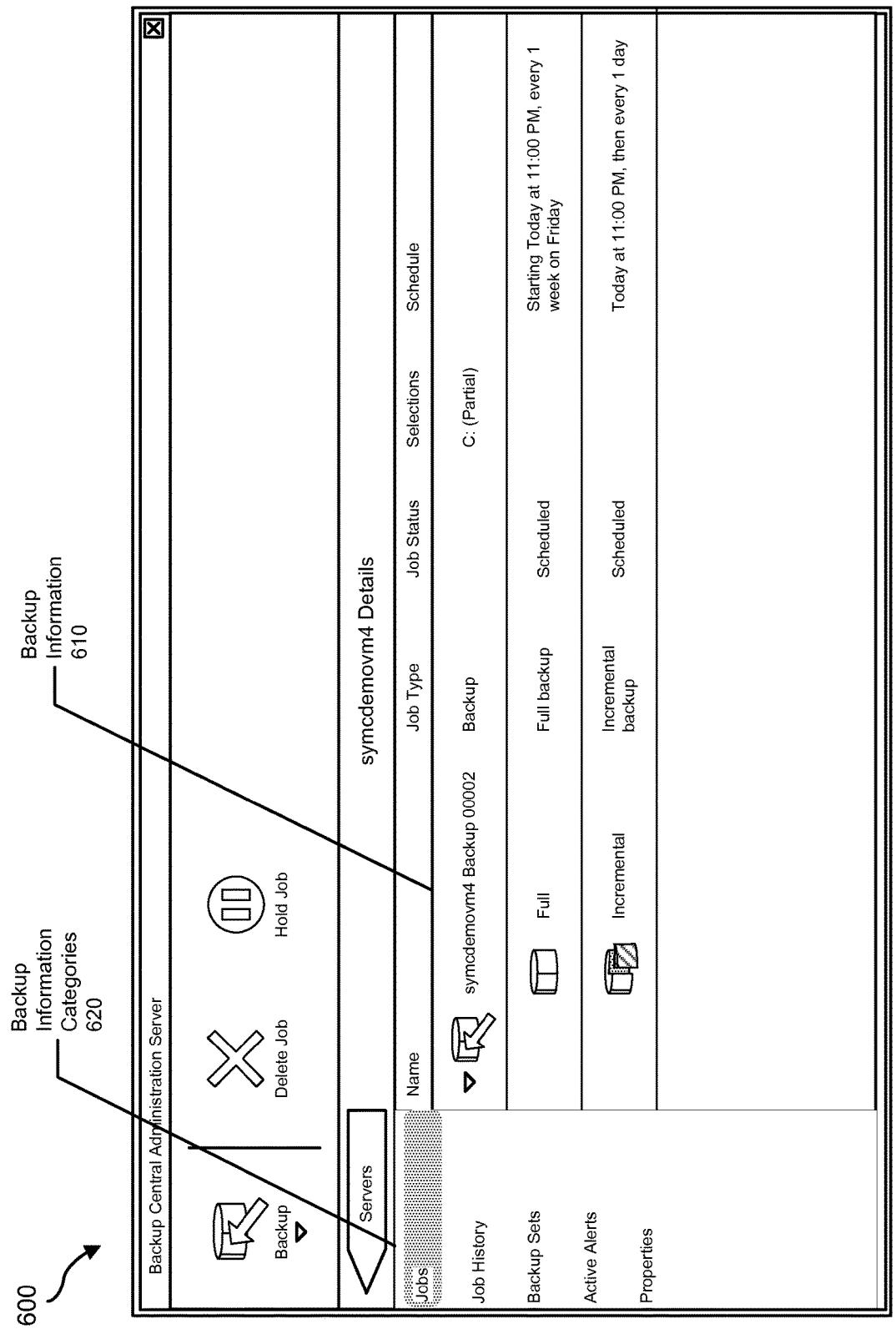
FIG. 6 is a diagram of an exemplary graphical user interface for navigating backup configurations.

FIG. 6 illustrates an exemplary graphical user interface 600. Using FIG. 6 as an example, graphical user interface 600 may display backup information 610 relating to a server "symcdemovm4." For example, after a user selected selection 410 and clicked on an interface element 420, graphical user interface 600 may display backup information 610 relating to selection 410. As shown in FIG. 6, backup information 610 may include any of a variety of backup details about the selection. For example, backup information 610 may include information about one or more backup jobs configured for the selection (e.g., one or more computing resources specified by the selection). As shown in FIG. 6, the information about a backup job may include a job type, a job status, which portions of the computing resource are subject to the backup job, and/or a schedule for the backup job.

In some examples, displaying the backup information may include displaying a plurality of backup information categories, identifying a selected category within the plurality of backup information categories, and displaying information pertaining to the selected category. The plurality of backup information categories may include any of a variety of categories. For example, the plurality of backup information categories may include jobs relating to the selection, job histories relating to the selection, backup sets created for the selection, active alerts (e.g., generated from warnings and/or errors for backup jobs, statuses and configurations of a computing resource that may interfere with backup, etc.), relevant properties of the selection, etc.

Using FIG. 6 as an example, graphical user interface 600 may include backup information categories 620. As shown in FIG. 6, a category called "Jobs" may be selected within backup information categories 620. Accordingly, backup information 610 may display backup-jobs-related information relating to the selection made (e.g., selection 410 of FIG. 4).

In some examples, interface module 106 may constrain the plurality of backup information categories according to the selection of computing resources. For example, interface module 106 may display the plurality of backup information categories by identifying a plurality of computing systems within the selection, determining that each category within the plurality of backup information categories pertains to the plurality of computing systems in combination, identifying at least one inapplicable category that pertains to at least one computing system within the plurality of computing systems but which does not pertain to the plurality of computing systems in combination, and excluding the inapplicable category from the plurality of backup information categories. For example, a backup information category may pertain to the plurality of computing systems in combination because the backup information category includes information that is useful to an administrator in an overview of multiple computing resources. For example, interface module 106 may display backup information categories including "Jobs," "Job History," "Backup Sets," "Active Alerts," and "Properties" when displaying backup information for a single computing resource. In this example, interface module 106 may display backup information categories including only "Jobs," "Job History," and "Active Alerts" when displaying backup information for multiple computing resources because viewing backup sets corresponding to a plurality of computing resources may be unhelpful and viewing "properties" may only have meaning for view information about a single computing resource.

Figure 7:
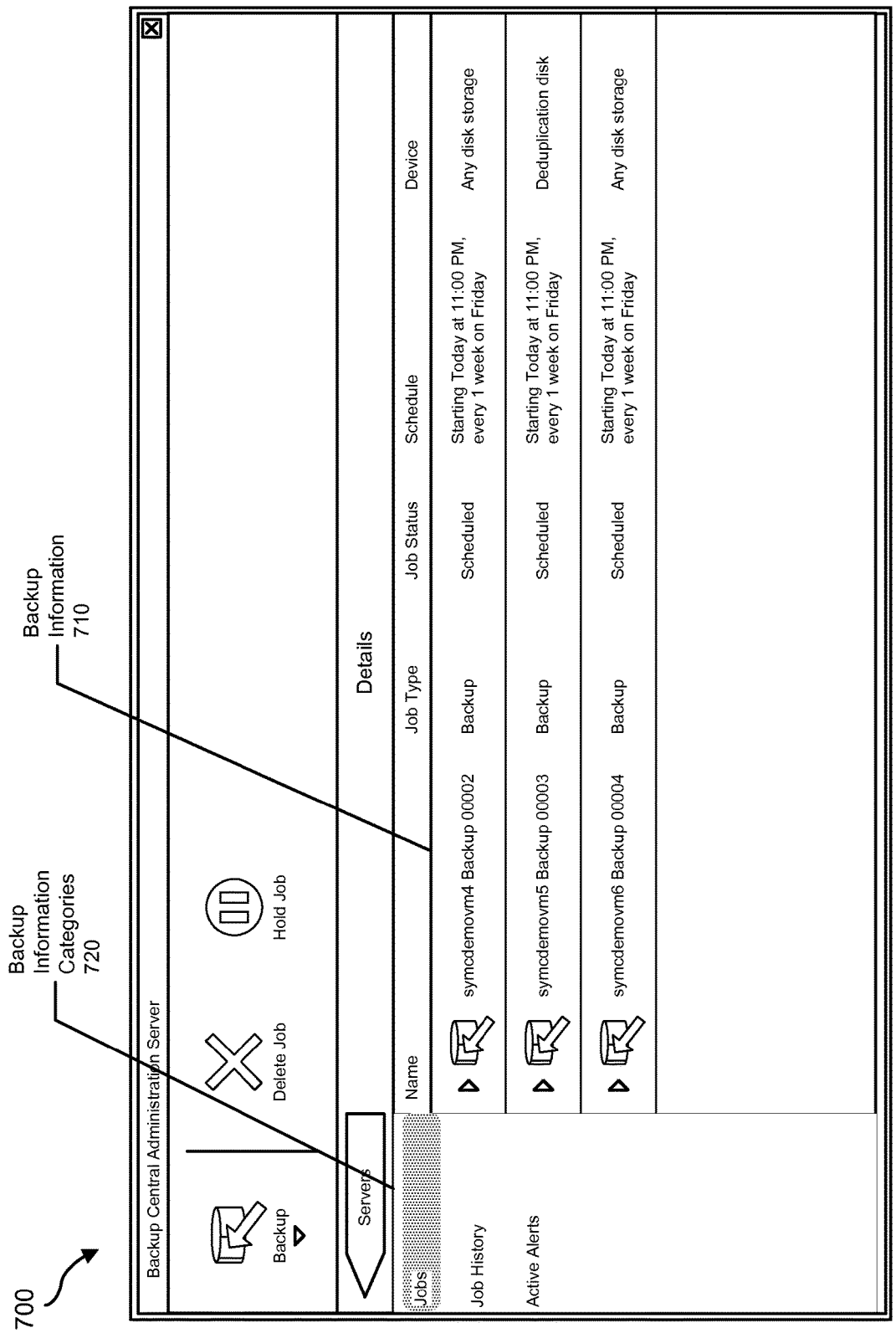
FIG. 7 is a diagram of an exemplary graphical user interface for navigating backup configurations.

FIG. 7 is an illustration of an exemplary graphical user interface 700. As shown in FIG. 7, graphical user interface 700 may display backup information 710 relating to a selection of a plurality of computing resources (e.g., selection 510 from FIG. 5). In particular, graphical user interface 700 may display a job-centric view of the plurality of selected computing resources. Graphical user interface 700 may also include backup information categories 720. As shown in FIG. 7, a backup information category named "Jobs" may be selected so that backup information 710 shows a job-centric view of the selection. Because selection 510 leading to graphical user interface 700 includes a plurality of computing resources whereas selection 410 leading to graphical user interface 600 includes a single computing resource, backup information categories 720 may include a different set of backup categories than backup information categories 620.

In some examples, interface module 106 may display a transition between a resource-centric view of the backup environment and a job-centric view (e.g., constrained by a selection of computing resources) of the backup environment. For example, interface module 106 may, in response to the input, display a transition within the graphical user interface between a view of the set of computing resources and a view of the backup information. The transition may include at least one intermediate view that includes at least a portion of the view of the set of computing resources and at least a portion of the view of the backup information. The transition may include any visual effect to help a user understand the relationship between the resource-centric view and the job-centric view. For example, the transition may include a sliding effect, wherein the resource-centric view slides away as the job-centric view slides in. Using FIGS. 5 and 7 as an example, a resource-centric view may begin with graphical user interface 500 and transition to a job-centric view in graphical user interface 700. For example, backup information 710 may slide into view by covering and/or appearing to push the list of computing resources.

As explained above, by providing a resource-centric view of backup environments (e.g., instead of a job-centric view), the systems and methods described herein may enable administrators to intuitively navigate through backup environments. In some examples, these systems and methods may also enable administrators to efficiently and intuitively transition between resource-centric views of backup environments and job-centric views based on selected resources. By improving the navigability of backup environments, these systems and methods may reduce time and effort spent managing backup environments and potentially reduce human error.

Figure 8:
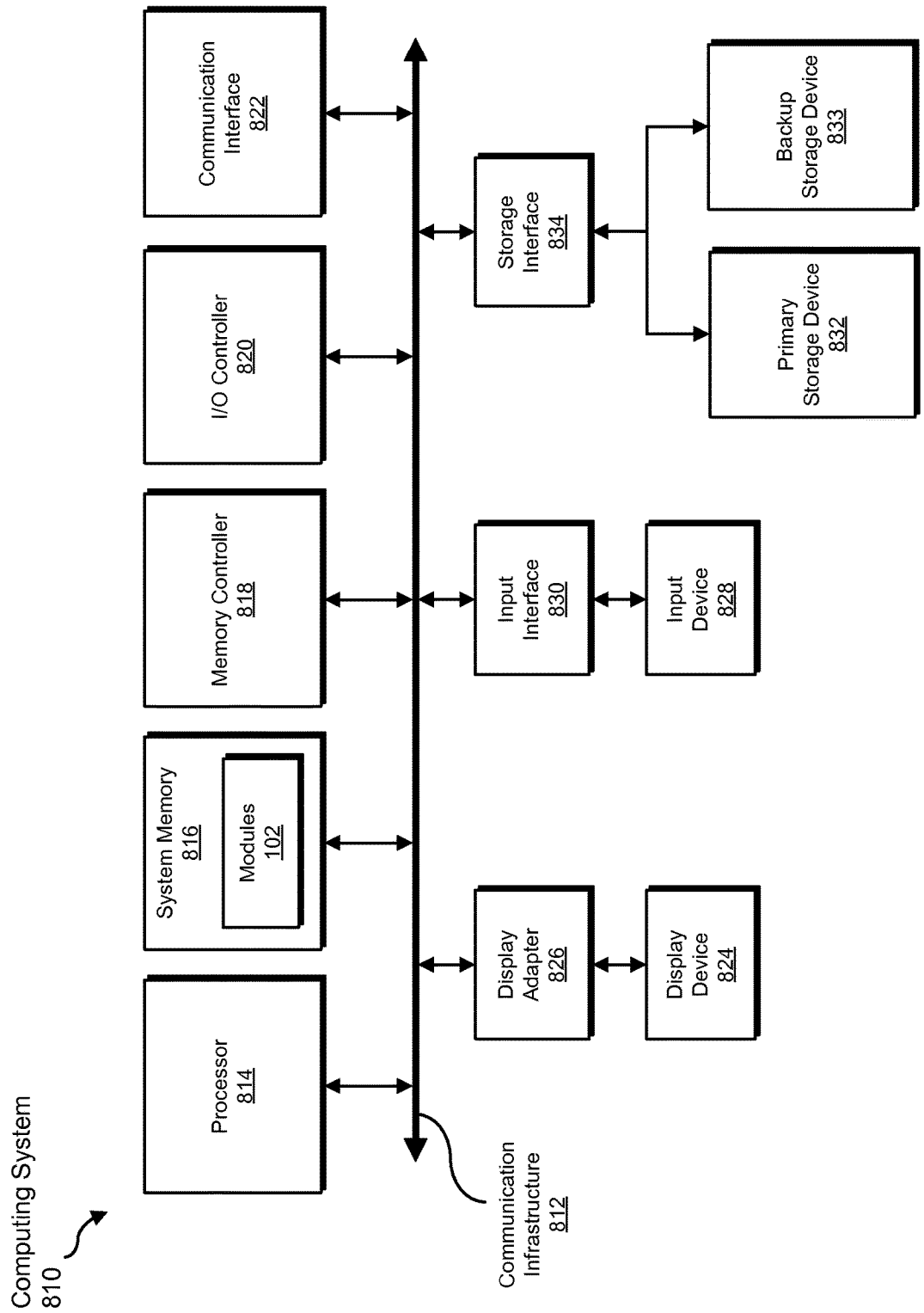
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the identifying, displaying, receiving, determining, and excluding steps described herein. All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 810. All or a portion of the computer program stored on the computer-readable-storage medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
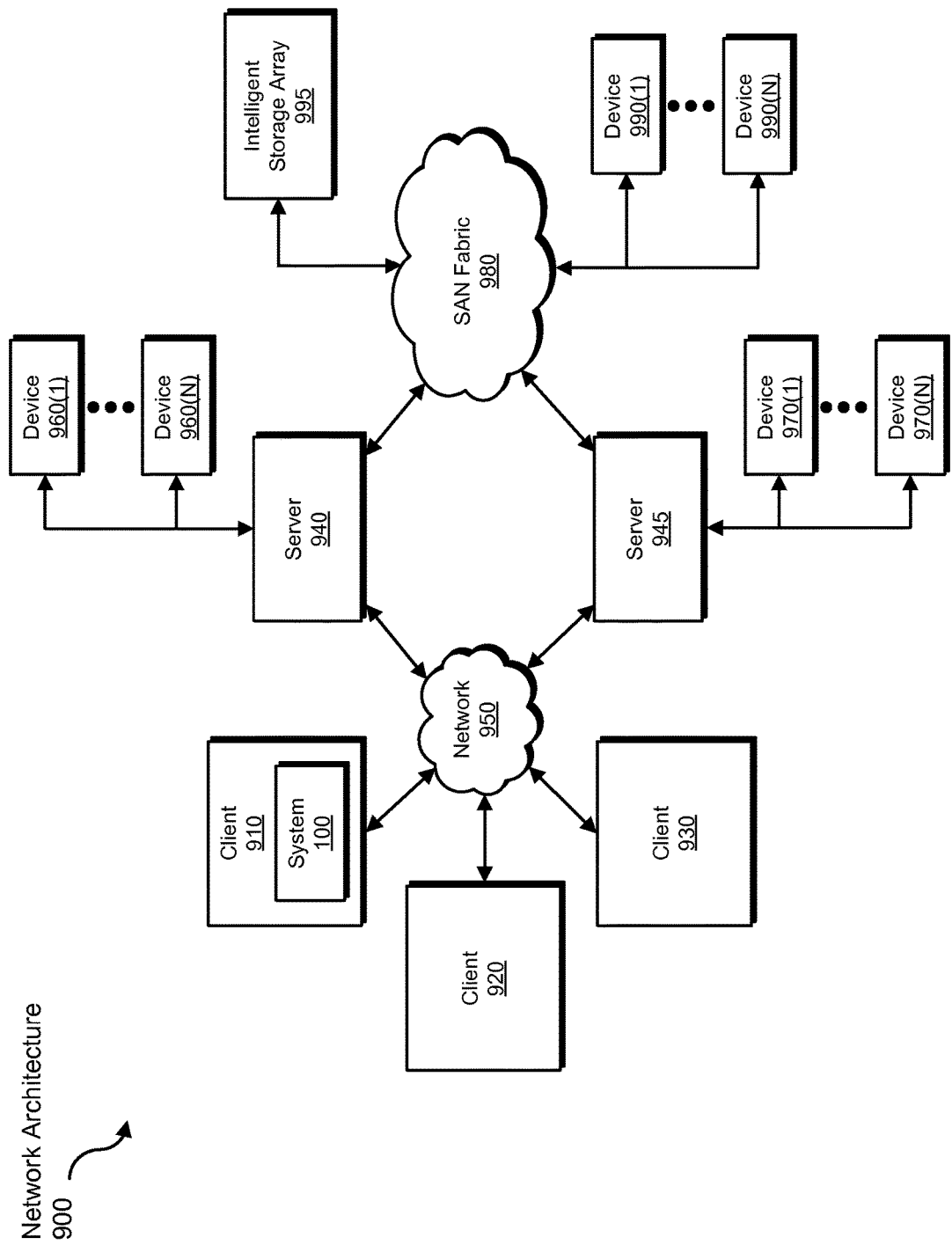
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the identifying, displaying, receiving, determining, and excluding steps disclosed herein. All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for navigating backup configurations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for navigating backup configurations.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for navigating backup configurations, at least a portion of the method being performed by a computing device comprising at least one processor, the method comprising:
    identifying a set of computing systems that are subject to backup jobs for protecting data stored by the computing systems within a backup environment managed by a backup system, wherein the backup system is separate from the set of computing systems;
    identifying a request to navigate a configuration of the backup system;
    in response to the request:
        displaying a resource-centric view of the backup environment by displaying the set of computing systems within a graphical user interface as selectable elements, wherein displaying the set of computing systems comprises displaying a current backup status for each computing system in the set of computing systems that summarizes whether the backup environment is up-to-date on backing up the computing system according to a most recent existing backup job scheduled to have been performed for the computing system;
        identifying a selection performed within the resource-centric view of the graphical user interface of at least two computing systems within the set of computing systems;
        receiving an input within the resource-centric view of the graphical user interface to provide, based on the selection performed within the resource-centric view, a job-centric view of the backup environment that is limited to the selection and that provides policy configuration information for each backup job that applies to backing up at least a part of the computing systems within the selection;
        in response to the input, displaying the job-centric view of the backup environment by displaying each backup job that applies to backing up at least a part of the computing systems within the selection within the resource-centric view.

2. The computer-implemented method of claim 1, wherein:
    the selection comprises a selection of a plurality of computing systems within the set of computing systems;
    job-centric view comprises information relating to the plurality of computing systems.

3. The computer-implemented method of claim 1, wherein identifying the selection comprises identifying a selection of a predefined group represented within the graphical user interface.

4. The computer-implemented method of claim 1, wherein identifying the selection comprises identifying an individual selection within the graphical user interface of each computing system within a subset of the set of computing systems.

5. The computer-implemented method of claim 1, wherein the job-centric view comprises at least one of:
    at least one backup job defined for a selected computing system within the set of computing systems;
    a backup history of the selected computing system;
    at least one alert from the backup system relating to the selected computing system.

6. The computer-implemented method of claim 1, wherein displaying the job-centric view comprises:
    displaying a plurality of backup information categories;
    identifying a selected category within the plurality of backup information categories;
    displaying information pertaining to the selected category.

7. The computer-implemented method of claim 6, wherein displaying the plurality of backup information categories comprises:
    identifying a plurality of computing systems within the selection;
    determining that each category within the plurality of backup information categories pertains to the plurality of computing systems in combination;
    identifying at least one inapplicable category that pertains to at least one computing system within the plurality of computing systems but which does not pertain to the plurality of computing systems in combination;
    excluding the inapplicable category from the plurality of backup information categories.

8. The computer-implemented method of claim 1, further comprising providing, in the job-centric view of the backup environment, at least one of:
    an input element to place a backup job within the job-centric view on hold;
    an input element to delete a backup job within the job-centric view.

9. The computer-implemented method of claim 1, wherein the configuration information comprises a schedule that defines a periodicity with which backup operations for a backup job are performed.

10. A system for navigating backup configurations, the system comprising:
    an identification module programmed to:
        identify a set of computing systems that are subject to backup jobs for protecting data stored by the computing systems within a backup environment managed by a backup system, wherein the backup system is separate from the set of computing systems;

identify a request to navigate a configuration of the backup system;

an interface module programmed to, in response to the request:
- display a resource-centric view of the backup environment by displaying the set of computing systems within a graphical user interface as selectable elements, wherein displaying the set of computing systems comprises displaying a current backup status for each computing system in the set of computing systems that summarizes whether the backup environment is up-to-date on backing up the computing system according to a most recent existing backup job scheduled to have been performed for the computing system;
- identify a selection performed within the resource-centric view of the graphical user interface of at least two computing systems within the set of computing systems;
- receive an input within the resource-centric view of the graphical user interface to provide, based on the selection performed within the resource-centric view, a job-centric view of the backup environment that is limited to the selection and that provides policy configuration information for each backup job that applies to backing up at least a part of the computing systems within the selection;
- in response to the input, display the job-centric view of the backup environment by displaying each backup job that applies to backing up at least a part of the computing systems within the selection within the resource-centric view;

at least one processor configured to execute the identification module and the interface module.

11. The system of claim 10, wherein:
the selection comprises a selection of a plurality of computing systems within the set of computing systems;
the job-centric view comprises information relating to the plurality of computing systems.

12. The system of claim 10, wherein the interface module is programmed to identify the selection by identifying a selection of a predefined group represented within the graphical user interface.

13. The system of claim 10, wherein the interface module is programmed to identify the selection by identifying an individual selection within the graphical user interface of each computing system within a subset of the set of computing systems.

14. The system of claim 10, wherein the job-centric view comprises at least one of:
at least one backup job defined for a selected computing system within the set of computing systems;
a backup history of the selected computing system;
at least one alert from the backup system relating to the selected computing system.

15. The system of claim 10, wherein the interface module is programmed to display the job-centric view by:
displaying a plurality of backup information categories;
identifying a selected category within the plurality of backup information categories;
displaying information pertaining to the selected category.

16. The system of claim 15, wherein the interface module is programmed to display the plurality of backup information categories by:
identifying a plurality of computing systems within the selection;
determining that each category within the plurality of backup information categories pertains to each computing system within the plurality of computing systems;
identifying at least one inapplicable category that pertains to at least one computing system within the plurality of computing systems but which does not pertain to each computing system within the plurality of computing systems;
excluding the inapplicable category from the plurality of backup information categories.

17. A non-transitory computer-readable-storage medium comprising one or more computer-executable instructions that, when executed by at least one processor of a computing device, cause the computing device to:
identify a set of computing systems within a backup environment managed by a backup system, wherein the backup system is separate from the set of computing systems;
identify a request to navigate a configuration of the backup system;
in response to the request:
- display a resource-centric view of the backup environment by displaying the set of computing systems within a graphical user interface as selectable elements, wherein displaying the set of computing systems comprises displaying a current backup status for each computing system in the set of computing systems that summarizes whether the backup environment is up-to-date on backing up the computing system according to a most recent existing backup job scheduled to have been performed for the computing system;
- identify a selection performed within the resource-centric view of the graphical user interface of at least two computing systems within the set of computing systems;
- receive an input within the resource-centric view of the graphical user interface to provide, based on the selection performed within the resource-centric view, a job-centric view of the backup environment that is limited to the selection and that provides policy configuration information for each backup job that applies to backing up at least a part of the computing systems within the selection;
- in response to the input, display the job-centric view of the backup environment by displaying each backup job that applies to backing up at least a part of the computing systems within the selection within the resource-centric view.

18. The computer-readable-storage medium of claim 17, wherein:
the selection comprises a selection of a plurality of computing systems within the set of computing systems;
the job-centric view comprises information relating to the plurality of computing systems.

19. The computer-readable-storage medium of claim 17, wherein the one or more computer-executable instructions cause the computing device to identify the selection by causing the computing device to identify a selection of a predefined group represented within the graphical user interface.

20. The computer-readable-storage medium of claim 17, wherein the one or more computer-executable instructions cause the computing device to identify the selection by causing the computing device to identify an individual selection within the graphical user interface of each computing system within a subset of the set of computing systems.

* * * * *